Sept. 22, 1925.　　　　　　　　　　　　　　　　1,554,573
R. C. GRIFFITH
VEHICLE BRAKE
Filed July 5, 1924　　　　2 Sheets-Sheet 2
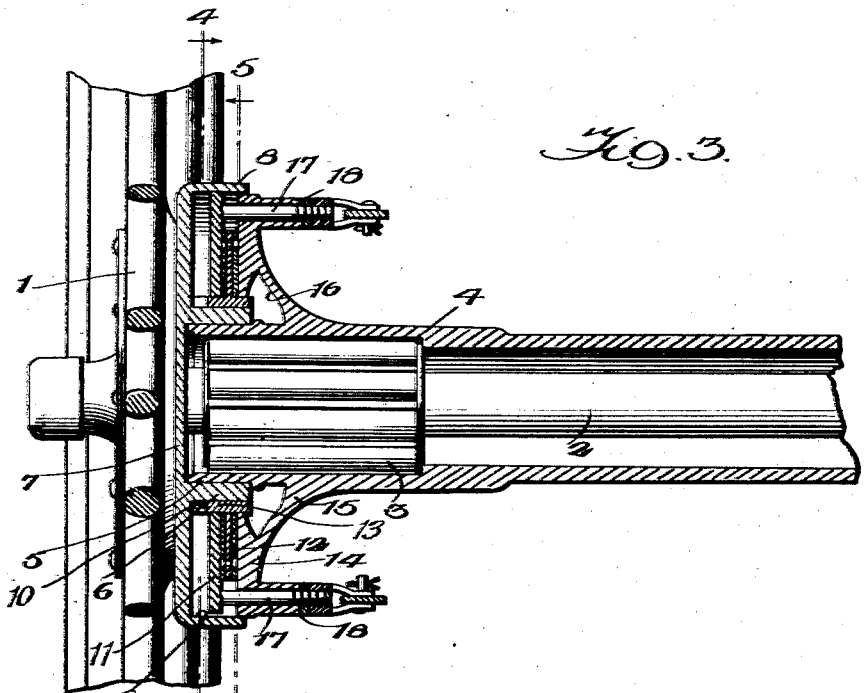
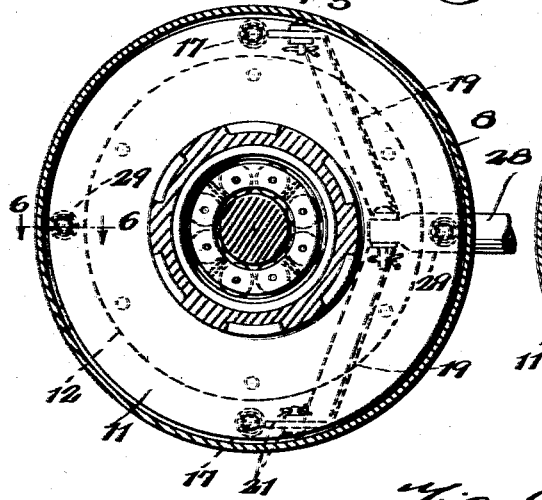
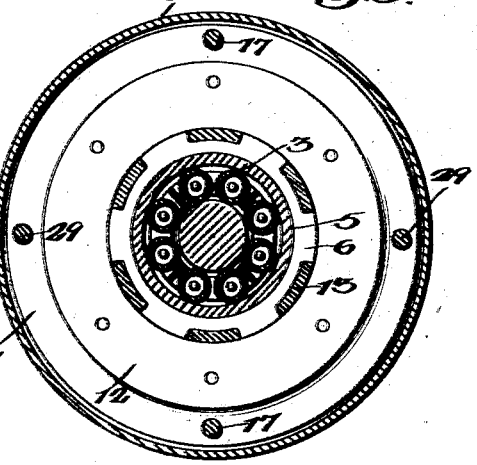
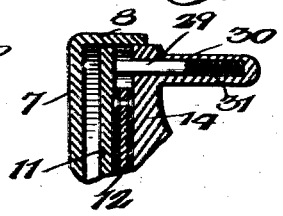
WITNESSES
INVENTOR
R. C. GRIFFITH,
BY
ATTORNEYS Patented Sept. 22, 1925.

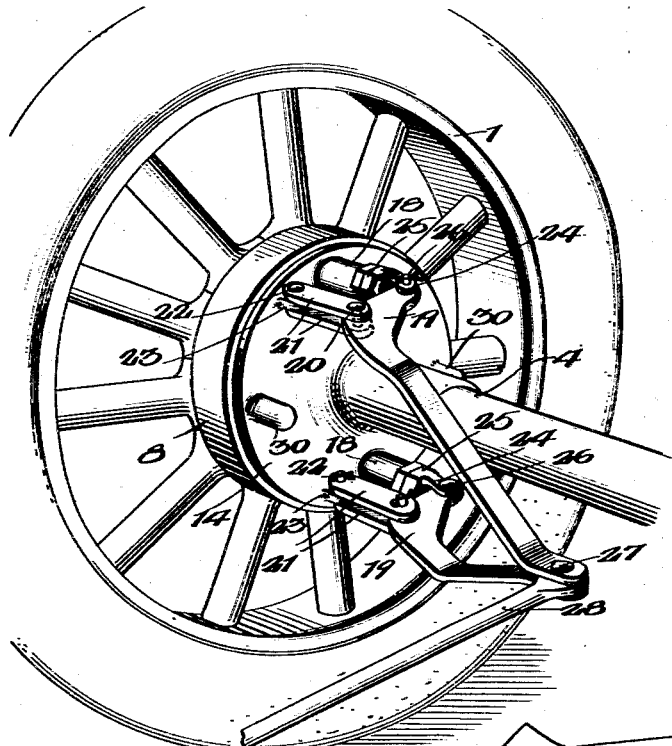

1,554,573

UNITED STATES PATENT OFFICE.

ROBERT COTTOM GRIFFITH, OF CONRAD, MONTANA, ASSIGNOR OF AN UNDIVIDED PART TO KATE GRIFFITH, OF CONRAD, MONTANA.

VEHICLE BRAKE.

Application filed July 5, 1924. Serial No. 724,507.

*To all whom it may concern:*

Be it known that I, ROBERT C. GRIFFITH, a citizen of the United States, and a resident of Conrad, in the county of Pondera and State of Montana, have invented certain new and useful Improvements in Vehicle Brakes, of which the following is a specification.

My invention relates to improvements in vehicle brakes, and it consists in the combinations, constructions and arrangements herein described and claimed.

More specifically defined, my invention contemplates the provision of a brake of that type which includes relatively movable disks, one of which is rotatable while the other is stationary and one of which is movable axially to and from position to frictionally engage with an associated stationary disk to provide the desired braking action.

An object of the invention is to provide a brake of the character described which comprises but relatively few parts, is simple and easy of operation and is effective in use when applied to a driven wheel of an automobile or like vehicle.

A further object of the invention is to provide a brake of the character described which has facilities for providing a desired braking action as a result of a relatively slight movement of the operating parts of the brake and which will operate in a smooth and uniform manner, irrespective of whether the vehicle is moving in a forward or backward direction at the time the braking action is applied.

Other objects and advantages will be apparent from the following description, considered in conjunction with the accompanying drawings, in which Figure 1 is a perspective view of an automobile wheel assembly equipped with a brake mechanism embodying the invention, Figure 2 is a perspective group view of the elements of the brake mechanism detached from one another, Figure 3 is a longitudinal vertical section through the automobile wheel, brake and axle assembly, Figure 4 is a section along the line 4—4 of Figure 3, Figure 5 is a section along the line 5—5 of Figure 3, and Figure 6 is a relatively enlarged fragmentary sectional view taken substantially along the line 6—6 of Figure 4.

In the drawings, the numeral 1 designates an automobile wheel of ordinary construction which is secured in the usual manner to an axle 2 at one end of the latter and for rotation with the axle. The latter is supported anti-frictionally, as by means of the roller bearings 3 to rotate in an axle housing 4. The latter has the end portion thereof proximate to the wheel 1 and indicated at 5 received in a sleeve member 6 which is integral with a plate 7. The latter is circular in configuration and the sleeve 6 extends laterally thereof in concentric relation thereto. The plate 7 is secured to the wheel 1 in any suitable known manner to rotate with the latter and is provided with an integral marginal ring portion 8 which extends inwardly from the wheel in spaced concentric relation to the sleeve 6. The plate 7 and the marginal ring portion 8 comprise what may be termed a casing and it will be observed that the provision of the sleeve 6 divides the interior of the casing into an inner compartment in which the end portion 5 of the axle housing is received and an annular outer compartment indicated at 9.

The sleeve 6 is provided with a plurality of spaced apart channels 10 in its outer peripheral wall and extending longitudinally thereof. A brake disk 11 is slidably and rotatably supported on the sleeve 6 for movement axially within the compartment 9. A friction disk 12 which may comprise a plurality of disk sections made of a suitable slightly compressible material, such as any one of the well known materials adapted for use in brake bands, secured together in any suitable known manner is mounted on the sleeve 6 inwardly from the disk 11. The friction disk 12 is slidable longitudinally of the sleeve 6 but is locked against rotation relatively to the sleeve 6 by means of locking strips 13 which are secured to the inner peripheral wall of the friction disk 12 in position to enter and slide in the channels 10 of the sleeve 6. The locking strips 13 extend beyond the plane of the outer face of the friction disk 12 in underlying relation to the brake disk 11 as best seen in Figure 3. The locking strips 13 also extend inwardly of the hub beyond the plane of the inner face of the friction disk 12 in underlying relation to a stationary friction disk 14 which is integrally connected at 15 to the axle housing 4 adjacent to the outer end of the latter, an annular space 16 being formed at the juncture of the disk 14 and the body of the axle housing for the reception of a suitable lubricant. The outer face of the disk 14 is plane so that the friction disk 12 will closely contact at all points on its inner face with the outer face of the disk 14 when the friction disk 12 is clamped against the disk 14 by means which will now be described.

The means for operating the brake disk 11 includes a pair of pins 17 which extend from diametrically opposite points on the brake disk 11 adjacent to the marginal edge of the brake disk through tubular guides 18 which constitute integral parts of the disk 14. The guide pins 17 extend at right angles to the plane of the brake disk 11 and in parallel relation to the axis of the axle 2. Bell crank levers 19 are provided for the pins 17, there being a bell crank lever for each pin 17. Each bell crank lever is fulcrumed as at 20 on a pair of links 21 which are attached pivotally as at 22 to an inwardly extending lug 23 on the inner face of the disk 14, the arrangement being such that the bell crank lever will be supported in position to permit attachment of a relatively short arm thereof to the inner end of the adjacent pin 17, as by means of a pair of spaced apart ears 24 on a nut 25 which is screwed on the inner end of the adjacent pin 17 in conjunction with a pivot pin 26 which extends through alined openings in the ears 24 and the end portion of the relatively short arm of the bell crank. The longer arms of the bell crank levers are pivotally attached at 27 to an operating rod 28 which may be adapted for connection with suitable means, not shown, whereby motion may be transmitted to the bell crank levers from a brake lever which may be mounted on the vehicle in position to be operated by the driver of the vehicle. It will be manifest that when the bell crank levers 19 are rocked in one direction on their fulcrums, the pins 17 will be moved axially in the guide sleeves 18 in the direction opposite the wheel 1 and the brake disk 11 will be pulled flatwise against the friction disk 12, thereby clamping the latter against the stationary friction disk 14 and providing a braking action upon the wheel 1.

The brake disk 11 is provided with other guide pins as indicated at 29 which extend inward from circumferentially spaced apart points on the inner face of the brake disk, there preferably being two of the guide pins 29 and the respective guide pins 29 preferably being disposed 180 degrees apart and 90 degrees from the pins 17. Each guide pin 29 extends into a guide socket 30 which extends laterally of the inner face of the stationary disk 14 and is integral with the latter. An expansion spring 31 in each socket 30 reacts against the inner end of the guide pin 29 that extends into that socket and tends to hold the brake disk 11 against moving axially in the direction of the stationary disk 14 so that the friction disk 11 normally is held out of frictional contact with the friction disk 12 and the latter likewise will remain out of frictional contact with the stationary disk 14.

From the foregoing description of the various parts of the device, the operation thereof may be readily understood. When it is desired to exert a braking action on the wheel 1, the rod 28 is actuated to cause a pull to be exerted through the bell crank levers 19 on the pins 17 and on the brake disk 11. The latter will be moved axially in the direction of the stationary disk 14 to an extent necessary to provide the desired breaking effect. As soon as the pull on the pins 17 is relaxed, the springs 31 will function to thrust the brake disk 11 axially in the direction away from the stationary disk 14 so that the friction disk 12 is permitted to rotate freely with the sleeve 6 and the plate 7 between the non-rotating disks 14 and 11. The plate 7 of course is fixed to the wheel 1 to rotate with the latter and any breaking action on the sleeve 6, as takes place when the friction disk 12 is compressed or clamped between the disks 11 and 14, will result in a corresponding braking action on the wheel 1.

It is to be observed that the braking action will be obtained practically instantaneous with the actuation of the bell crank levers to pull the brake disk against the friction disk 12 and that the frictional engagement of normally relatively moving parts covers a relatively large area for a brake mechanism of a given size. A relatively great braking action therefore can be obtained with but slight strain of the normally relatively moving parts and with the application of but slight force tending to move the brake disk 11 toward clamping position. It also will be observed that the braking action will be discontinued coincidentally with the cessation of pull on the pins 17 since the inherently actuated spring members 31 will return the brake disk 11 to nonclamping position as soon as the pull thereon has been relaxed.

Leaking of lubricant from the axle housing will not in any way interfere with the operation of the brake. Any broken or worn parts of the device can be quickly and easily repaired or replaced. Moverover, the use of the brake mechanism does not interfere with the removal and replacement of the wheel to which the casing 7—8 is attached. Attention also is directed to the fact that the casing 7—8 may serve as a brake drum for an outside brake of ordinary construction in addition to serving as a casing for certain of the hereinbefore described parts of my improved brake mechanism.

Obviously, my invention is susceptible of embodiment in forms other than that illustrated in the accompanying drawings, and I therefore consider as my own all modifications and adaptations thereof that fairly fall within the scope of the appended claims.

I claim:

1. In a brake mechanism for automobile wheels, a casing adapted to surround the axle housing for a driven wheel of an automobile and to be secured to said driven wheel, said casing including a sleeve member extending inwardly from the wheel in encircling relation to said axle housing, a brake disk rotatable and slidable on said sleeve member, a friction disk slidable on the sleeve member and locked to the latter to rotate therewith, a disk rigid with said axle housing and encircling the inner end portion of said sleeve member, said last named disk and said brake disk being located at opposite sides of said second named disk, guide pins extending from said brake disk through openings in said stationary disk, means whereby a pull may be exerted on certain of said pins to move said brake disk axially to position to clamp said second named disk against said stationary disk, and spring means acting on the remaining pins to tend to return said brake disk from position to clamp the second named disk against said stationary disk.

2. In a brake mechanism of the character described, a casing comprising a plate adapted to be arranged at one end of an axle housing in encircling relation to the axle for a driven ground wheel and to be secured to said wheel, said plate having an outer annular portion extending inwardly from the wheel at the marginal edge thereof and having an inner annular member extending inwardly from the wheel in encircling relation to the adjacent end portion of said axle housing, said inner annular member having longitudinal channels in the outer peripheral wall thereof, a brake disk slidable and rotatable on said inner annular member, a friction disk mounted on said inner annular member inwardly from the brake disk, strips carried on the inner wall of said friction disk for engaging said channels in the outer wall of said inner annular member to hold said friction disk against rotation with relation to the inner annular member and to permit axial movement of the friction disk on said member, a disk integral with said axle housing and disposed at the side of said friction disk opposite to said brake disk, means whereby said brake disk is held against rotation relatively to said stationary disk and is permitted to move axially to and away from said stationary disk, means cooperative with said last named means for moving said brake disk toward said stationary disk to clamp said friction disk to said stationary disk, and spring means resisting movement of said brake disk to position to clamp said friction disk to said stationary disk.

ROBERT COTTOM GRIFFITH.